United States Patent [19]
Roscoe

[11] Patent Number: 5,528,495
[45] Date of Patent: Jun. 18, 1996

[54] CADMIUM ZINC TELLURIDE BOREHOLE DETECTOR

[75] Inventor: Bradley A. Roscoe, Ridgefield, Conn.

[73] Assignee: Schlumberger Technology Corporation, New York, N.Y.

[21] Appl. No.: 115,944

[22] Filed: Sep. 1, 1993

[51] Int. Cl.$^6$ .................................................. G06F 167/00
[52] U.S. Cl. ............................................................ 364/422
[58] Field of Search ..................................... 364/422, 421

[56] References Cited

U.S. PATENT DOCUMENTS

| | | |
|---|---|---|
| 3,977,018 | 8/1976 | Catagnus et al. . |
| 4,883,956 | 11/1989 | Melcher et al. . |
| 4,958,080 | 9/1990 | Melcher . |
| 5,391,882 | 2/1995 | Rhiger ................................ 250/370.13 |

OTHER PUBLICATIONS

"Influence of passivating coatings on electrophysical properties of (Cd,Hg) Te crystals", Belyaev et al., Sov. Phys. Semicond. 25(7), Jul. 1991, pp. 04–706.

"CdTe Low Level Gamma Detectors Based on a New Crystal Growth Method", E. Raiskin and J. F. Butler, IEEE Transactions on Nuclear Science, vol. 35, No. 1, Feb. 1988, pp. 81–84.

"Properties of CdZnTe Crystals Grown By A High Pressure Bridgman Method", F. P. Doty et al., Extended Abstracts, The 1991 U.S. Workshop on the Physics and Chemistry of Mercury Cadmium Telluride and Other II–VI Compounds, Dallas, Texas, Oct. 1991.

"$Cd_{1-x}Zn_x$Te Gamma Ray Detectors", J. F. Butler et al., IEEE 1991 Nuclear Science Symposium and Medical Imaging Conference, Santa Fe, NM, Nov. 1991.

"Gamma– and X–Ray Detectors Manufactured from $Cd_{1-x}Zn_x$Te Grown by a High Pressure Bridgman Method", J. F. Butler et al., EMRS 1992 Spring Meeting, Strasbourg, France, Jun. 2–5, 1992, (Session F–IX.2).

"X–Ray Detector Physics and Applications", Richard B. Hoover, SPIE Proceedings, vol. 1736, Jul. 1992, pp. 43 . 53.

"Growth and Characterization of the Complete $Cd_{1-x}Zn_x$ Alloy Series", R. Triboulet et al., Journal of Crystal Growth, 65(1983) pp. 262–269.

*Primary Examiner*—Donald E. McElheny, Jr.
*Attorney, Agent, or Firm*—Martin D. Hyden; Leonard W. Pojunas

[57] ABSTRACT

A gamma ray or x-ray detector for borehole use includes a cadmium zinc telluride crystal having the general formula $CD_{1-x}Zn_x$Te, where x represents the zinc fraction of the material and preferably is within the range of $0.05 \leq x \leq 0.95$. The noise edge and energy resolution characteristics of the detector may be improved by surface treating the crystal to reduce leakage current. The detector has particular application to bulk density and photoelectric absorption factor logging.

14 Claims, 3 Drawing Sheets

CADMIUM ZINC TELLURIDE BOREHOLE DETECTOR

BACKGROUND OF THE INVENTION

1. Field of the Invention

The present invention relates to an improved cadmium zinc telluride (CZT) detector for detecting x-rays or gamma rays and, more particularly, to an improved CZT detector that is useful for detecting x-rays or gamma-rays in a high temperature environment such as an oil well borehole.

2. The Prior Art

In nuclear borehole logging, e.g. in gamma ray-based density and lithology logging, it is important that the gamma ray detectors employed be able to operate at the high temperatures typically encountered in boreholes without undue noise or loss of energy resolution. Borehole temperatures of 150° C.–175° C. and above are not uncommon. Thus historically scintillators and gas tubes have been used as x-ray and gamma ray detectors in nuclear logging tools because of their superior high temperature performance, notwithstanding that such detectors are inferior to solid state detectors (e.g., germanium, silicon and cadmium telluride) in energy resolution, size and noise. This is principally because in most borehole applications, detector noise, dominated by detector leakage current (which is highly temperature sensitive), limits the usefulness of solid state detectors. The use of solid state detectors in borehole logging tools, therefore, has heretofore required a dewar and/or other cooling devices to hold the detector at a low operating temperature to maintain energy resolution and low noise. This cooling requirement substantially offsets any advantage of size afforded by solid state detectors, and further has a limiting effect on the useful lifetime of the detector in the borehole. There has long existed, therefore, a need for a solid state x-ray or gamma ray detector that operates efficiently at high temperatures over a sustained time period without the requirement for cooling.

CZT is a relatively new, solid state, gamma ray/x-ray detector material that is marketed commercially by Aurora Technologies Corporation. of San Diego, Calif. It is grown by a high pressure, vertical Bridgman technique which yields boules of approximately four inches diameter and length. CZT is a ternary compound with a variable stoichiometry and is usually designated by the general formulae $Cd_{1-x}Zn_xTe$, where x represents the zinc fraction of the material. For x≈0.20, the CZT detector marketed by Aurora Corporation has a bandgap of 1.53 eV, an effective Z of 48, a density of 5.806g/cm$^3$, and a bulk resistivity of $\approx 10^{11}\Omega$-cm at 25° C. These properties compare favorably to those of cadmium telluride (CdTe): bandgap of 1.47eV, effective Z of 50, density of 6.06g/cm$^3$ and bulk resistivity of ≈109. The density and effective atomic number are slightly lower for CZT than for CdTe, but a major advantage of CZT is that its bulk resistivity is two orders of magnitude higher than that of commercially available CdTe.

CZT has received attention from workers in the room temperature, solid state detector industry, such as, for example, for-use in x-ray imaging. Heretofore, however, no attempt has been made to use CZT detectors in harsh, high temperature environments such as oil well boreholes.

SUMMARY OF THE INVENTION

The foregoing and other requirements of the prior art are met, in accordance with the invention, by the provision of a cadmium zinc telluride (CZT) detector having the general formulation $Cd_{1-x}Zn_xTe$, where x represents the zinc fraction of the material and, preferably, is $0.05 \leq x \leq 0.95$. Enhanced performance and lifetime at high temperatures and applied bias voltages is achieved by surface treating the detector crystal to minimize current leakage. In a preferred embodiment, the crystal surface is coated with boron nitride. Other surface treatments, e.g., oxidation of the CZT crystal surface, may also be employed.

In accordance with the invention, the CZT detector has particular application to bulk density and photoelectric absorption factor logging, for the latter of which the low noise edge of the CZT detector is especially advantageous.

BRIEF DESCRIPTION OF THE DRAWINGS

For a further description of the invention, reference may be made to the following description of an exemplary embodiment thereof, taken in conjunction with the accompanying drawings, in which.

DESCRIPTION OF AN EMBODIMENT

For illustrative purposes, a representative embodiment of the present invention is described hereinbelow in the context of bulk density ($Q_b$) logging and photoelectric absorption factor ($P_e$) logging, for which purpose the CZT detector of the invention has particular application. It will be understood, however, that the invention is not limited to such logging tools, but that it has general application to other borehole uses where gamma ray or x-ray detection is required.

Figure 1:
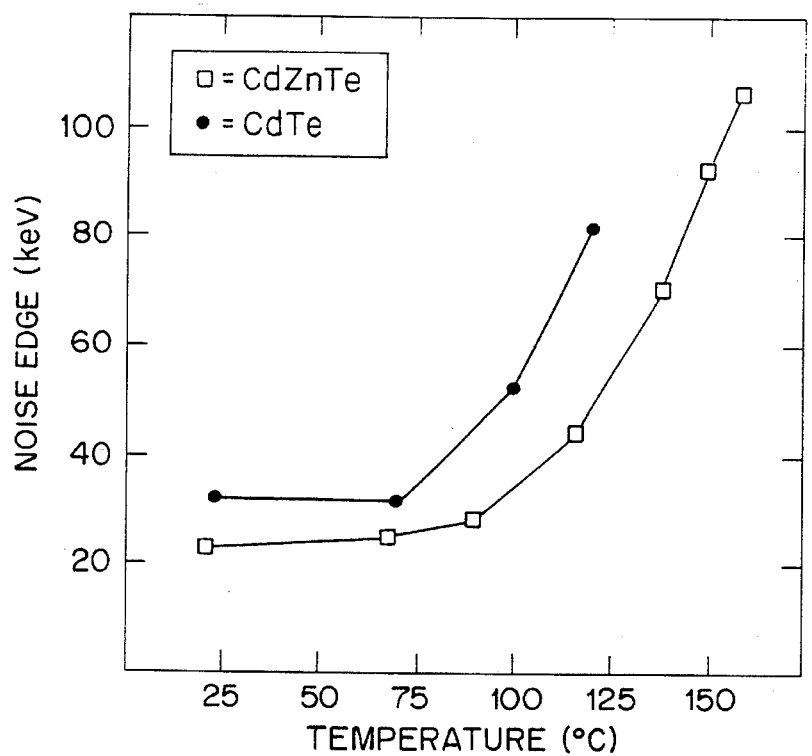
FIG. 1 is a plot showing the variation of the noise edge of a CZT detector relative to a cadmium telluride detector as a function of temperature.

As may be seen from a comparison of the bandgaps, atomic number densities, and bulk resistivities of CZT and CdTe (see above), the density and effective atomic number of CZT are only slightly lower than for CdTe, but the bulk resistivity of CZT is two orders of magnitude greater than for the best commercially available CdTe. This means that, all else being the same, the leakage current and noise edge response of CZT should be improved over CdTe. That CZT does in fact have a lower leakage current—and hence a lower noise edge—than CdTe at elevated temperatures is shown in FIG. 1, which plots the noise edge responses of a CZT detector and a CdTe detector as a function of temperature. The superior noise edge response of CZT is especially important in $P_e$ logging, where it is necessary to discriminate among photoelectric effect x-rays. For most earth formations, the photoelectric effect is the dominant gamma ray interaction process for gamma ray energies below about 100 kev. As may be seen from FIG. 1, the noise edge of the CZT detector remains below 100kev for up to approximately 150°

C., and affords a substantial advantage relative to CdTe in that respect.

Figure 2:
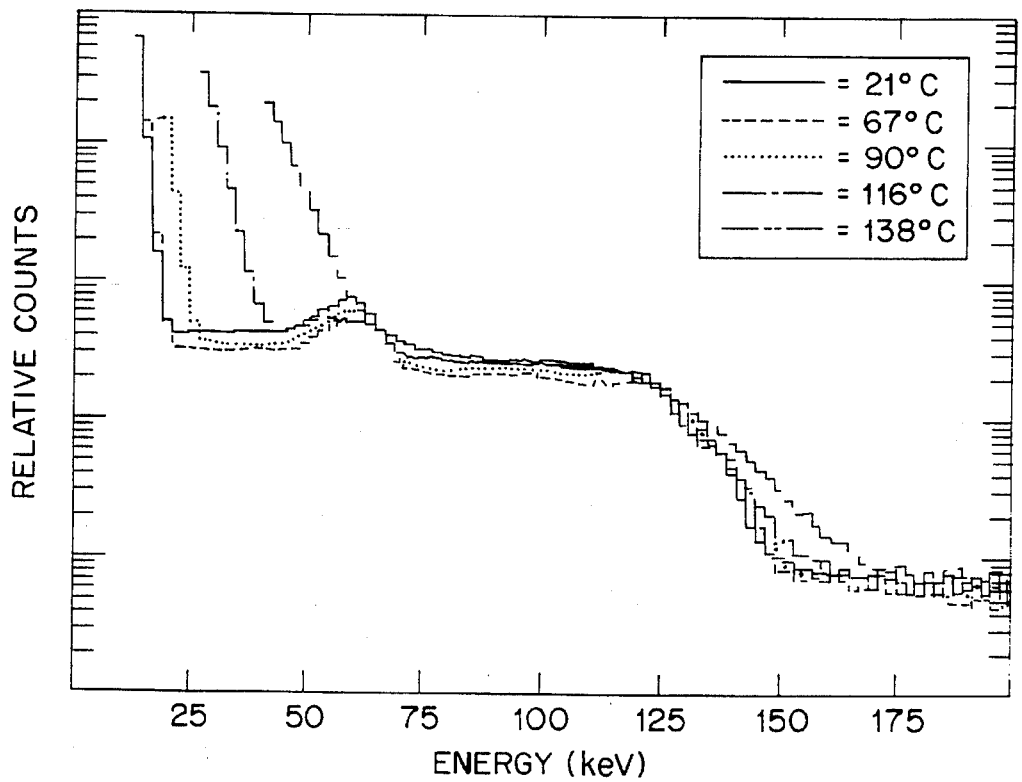
FIG. 2 is a plot of gamma ray energy spectra acquired with a CZT detector at various temperatures.

The low noise response of CZT provides good energy resolution and spectral shape at elevated temperatures. FIG. 2 depicts gamma ray spectra acquired with a CZT detector at 21° C., 67° C., 90° C., 116° C. and 138° C. The electronics employed to record the spectra of FIG. 2 included a Eurorad PR-1 preamplifier connected to the CZT detector (without a phototube), and modified to replace the 100 MΩ resistor with a 1MΩ resistor to allow operation at elevated temperature in view of the increased detector leakage current at such temperatures. The Eurorad PR-1 used was a CdTe matched preamplifier, but this was reasonable inasmuch as the capacitance of the CZT detector (8-10pf) was close to the capacitance of CdTe detectors. The preamp signal was fed into an Ortec 450 research amplifier and then to a LeCroy 3512 ADC and a LeCroy 3588 histogramming memory. Data acquisition was controlled by a Macintosh computer running LabView software. High voltage was supplied by an Ortec 459 H.V. supply.

The CZT detector crystal was 5×5×1.5 mm with gold contacts. It was operated at a bias of 200 volts. The Ortec 450 amplifier used a 0.1 µs shaping time, and its gain was manually adjusted to give similar spectrometer gains.

Care should be taken to insure that the output impedance of the high voltage power supply and the bias resistance of the Eurorad PR-1 preamplifier (1.7MΩ combined) are taken into account to maintain a constant electric field in the detector as temperature changes. Because of the large voltage drop across this resistance which results from the increase in leakage current with temperature, the actual voltage applied to the detector is reduced as temperature increases if the input voltage is not changed accordingly. Thus if input voltage is not changed to offset the effect of the aforementioned voltage drop, the charge collected in the detector will be reduced. This produces a small, but noticeable, effect.

For measurements in which the change in spectral response is important, mathematical spectral degradation functions could be generated and used to match reference spectra to on-line spectra. For purposes of the density measurements described herein, however, such degradation functions are usually unnecessary.

Although the data of FIGS. 1 and 2 show that CZT can work as an x-ray/gamma-ray detector, without cooling, at temperatures exceeding 125° C. it has been found that CZT degrades with long term exposure to high temperature if bias is applied. This degradation is characterized by an increase in the detector leakage current, which causes an increase in the effective noise edge of the detector. A surprising characteristic of this degradation is that the leakage current is increased primarily in the direction of the bias, i.e., after degradation the leakage current is higher in the direction the detector was biased at high temperature. The leakage current in the opposite direction is reasonably unchanged. Also, no degradation was observed in the absence of an applied bias.

Figure 3:
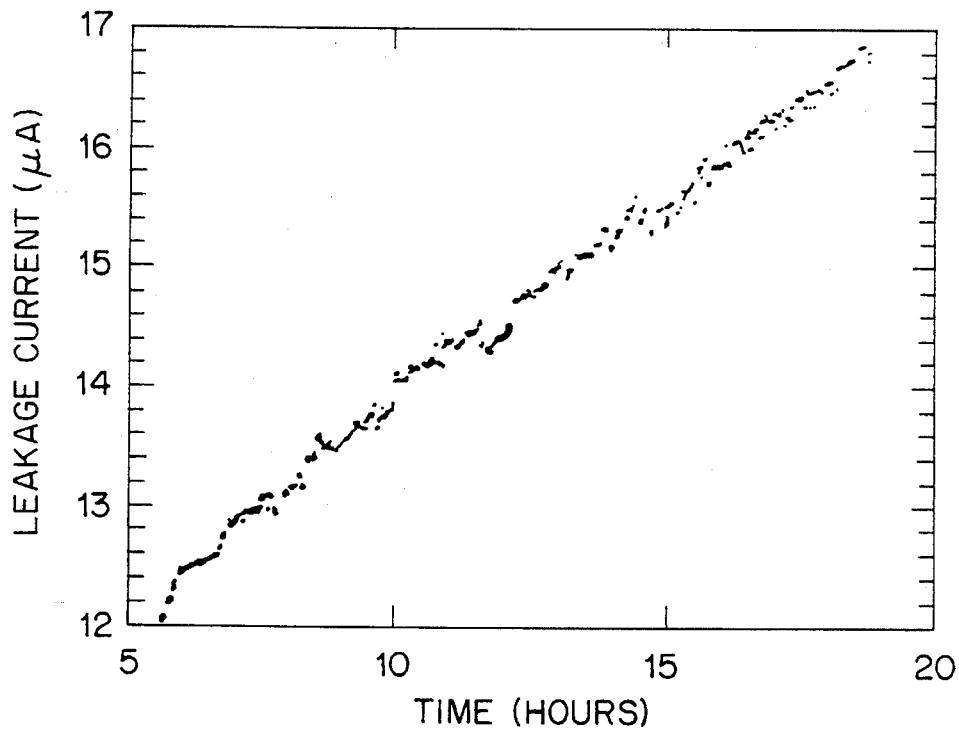
FIG. 3 is a plot of leakage current versus time of a bare CZT detector at 125° C. with 200 volts applied bias.

The leakage current of a bare CZT detector appears to increase linearly at elevated temperatures for a given voltage. FIG. 3, for example, shows the rate of detector degradation at 125° C. of a bare CZT detector (5×5×1.5mm) at 200 V bias. The rate of degradation is the slope of the curve, approximately 0.3 µA/hr. in this example. For normal spectroscopy measurements, the maximum leakage current that can be tolerated is approximately 5 µA. Thus assuming the initial leakage current is negligible, the CZT detector in the example of FIG. 3 would have a useful lifetime, without cooling, of approximately 15 hours at 125° C.

Figure 4:
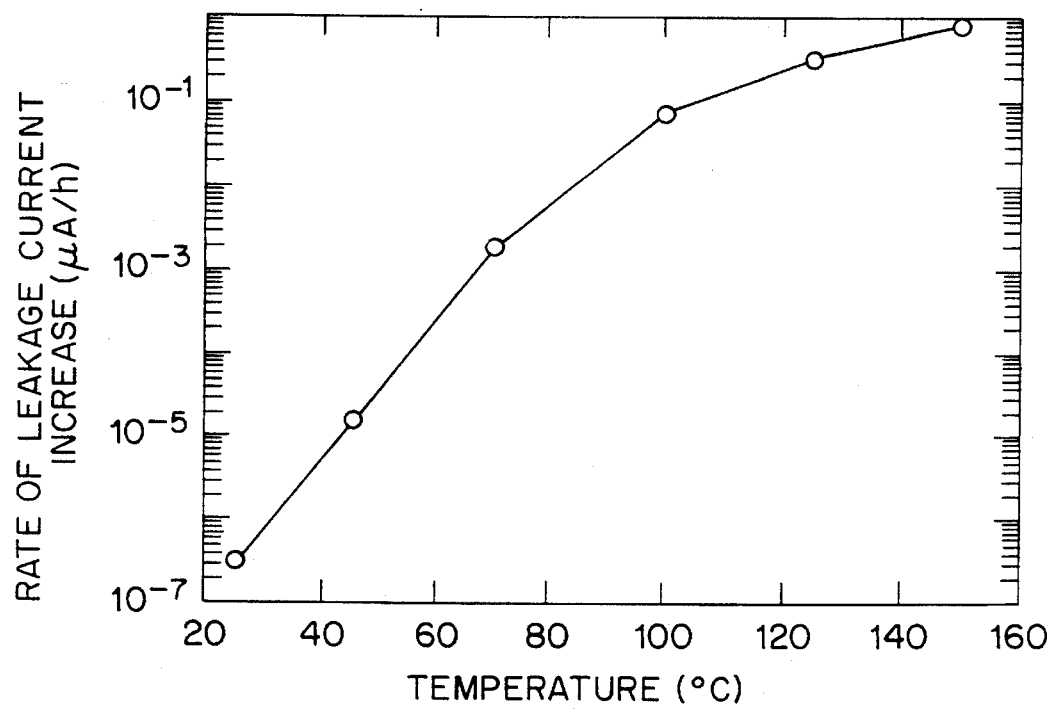
FIG. 4 is a plot showing the rate of increase of leakage current with temperature in a bare CZT detector at 200 volts applied bias.

FIG. 4 shows the rate of detector degradation (measured as leakage current) at 200 V applied bias as a function of temperature. Around room temperature, the detector degradation is approximately $10^{-6}$ µA/h. At this rate of degradation, a typical room temperature user would not notice the degradation. At elevated temperatures, however, the rate of degradation becomes substantial and at 150° C. is approaching 1 µA/hr. A bare, uncooled CZT detector, therefore, would have a useful lifetime at 150° C. of only about 5 hrs, again assuming a negligible initial leakage current.

It has been determined that the cause of the leakage current degradation is a surface phenomenon related (at least in part) to the release of cadmium from the detector surface. In accordance with the present invention, the useful lifetime of a CZT detector may be substantially improved by appropriate stabilization (or passivation) of the detector surface. Various surface treatments may be employed for that purpose, including, generally, (1) encapsulation of the detector and (2) surface reactions to stabilize the crystal.

Figure 5:
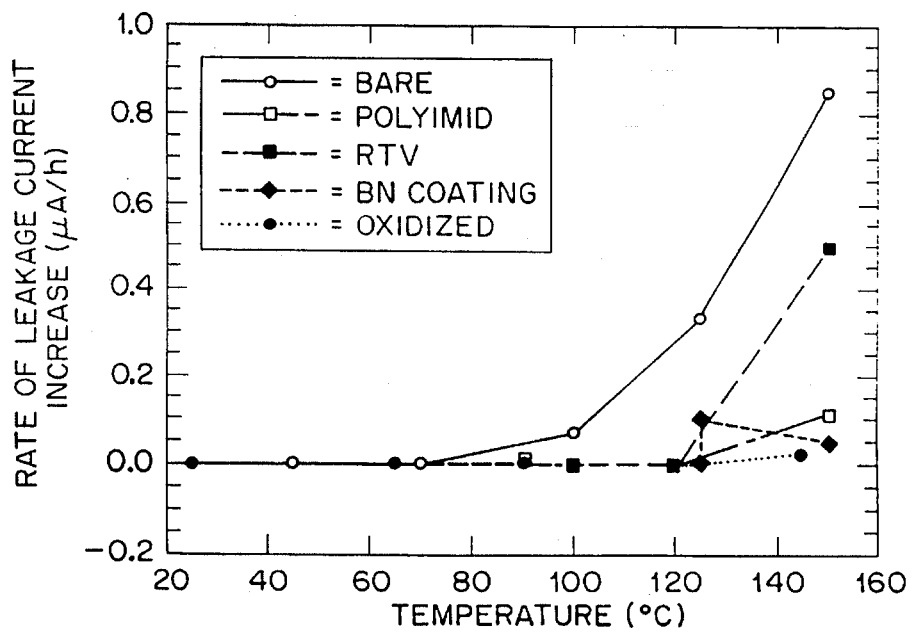
FIG. 5 is a plot showing the rate of increase of leakage current with temperature in a CZT detector with 200 volts applied bias with various surface treatments.

FIG. 5 compares the rate of increase of leakage current as a function of temperature for a bare CZT detector and CZT detectors coated with three different encapsulation materials.

One detector was potted in Dow Corning 184 silicon elastomer (indicated by the label RTV in FIG. 5). As shown in FIG. 5, this resulted in a substantially lower rate of detector degradation than for the bare detector in the 100° C.–125° C. range. At still higher temperatures, however, the RTV coated detector exhibits a degradation rate comparable to that for the bare CZT detector.

Another detector was coated with DuPont Parilyn Polyimide 2579, which has a curing temperature of 180° C. The rate of detector degradation for this material was fairly low (see the Polyimid line in FIG. 5) relative to the bare CZT detector rate, but after curing at 180° had a detector leakage current of 1 µA.

Still another detector was coated with boron nitride using a sputtering process. The deposition process did not degrade the detector and, as shown in FIG. 5 (see the line labelled BN Coating), the rate of degradation was reduced by an order of magnitude relative to that for bare CZT for temperatures up to 150° C.

FIG. 5 shows evidence of an anomaly at about 125° C. with the boron nitride coating. The rate of detector degradation started at a rate of ≈0.01 µA/hr., but after about 20 hours at 125° C. suddenly increased to ≈0.11 µA/hr. Upon being raised to 150° C., however, the degradation rate dropped to ≈0.05 µA/hr. Notwithstanding the apparent anomaly at 125° C. all of the degradation rates for the boron nitride coated detector at elevated temperatures are significantly better than for the bare CZT detector. Based on these data, an improvement in useful lifetime in the range of from 10:1 to 20:1 over the bare CZT detector is realized at 150° C. with the boron nitride coating.

Improved results were also obtained by oxidizing the CZT detector surface. This was performed by heating the detector, without voltage bias, to 150° C. for ≈150 hours. Detector bias was turned on, for a short time, several times during this heating cycle to measure the leakage current and any changes that occurred. The detector was then cooled back to room temperature and the leakage current remeasured. No increase in the room temperature leakage current was observed, thereby confirming that voltage must be applied for detector degradation to occur. This is believed to occur because no cadmium is emitted in the absence of applied bias.

The detector was then heated to 150° C. with bias applied. Leakage current increased, but at a lower rate than for an unoxidized CZT detector. The rate of degradation increased until it reached an apparent steady state value of ≈0.046 µA/hr., which compares well with the rate for the boron nitride coated CZT detector. (See the line labeled "Oxidized" in FIG. 5) After cooling down, the room temperature leakage current was ≈16 nA, or approximately 8 times the value before the 150° C. temperature run.

The data of FIGS. 1–5 were taken with Aurora Technologies—grown CZT detectors in which the zinc fraction x was ≈0.20. The available evidence indicates that increased band gaps—and thus increased bulk resistivity—can be expected at higher zinc fractions. Zinc fractions below 0.20 can also give improved performance, depending on how well the crystals are grown. Generally, the value of x may be within the range of from 0.05 to 0.95, subject only to the CZT crystals being grown with detector-grade quality.

Figure 6:
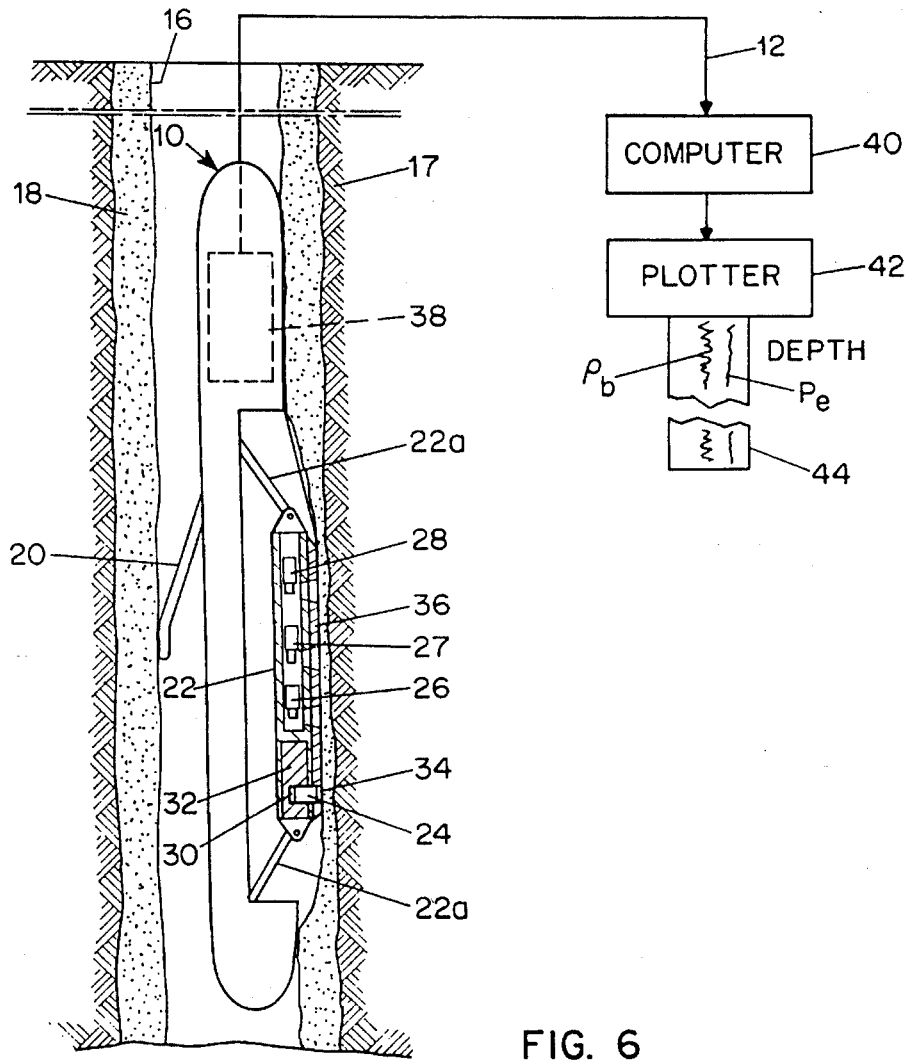
FIG. 6 is a schematic view of a borehole logging apparatus incorporating a CZT detector in accordance with the invention.

FIG. 6 illustrates a subsurface logging tool adapted to measure and record logs of bulk density ($\rho_b$) and the photoelectric absorption factor ($P_e$). As there shown, a logging sonde 10 is suspended by a cable 12 in a borehole 16, which is surrounded by earth formations 17. The formation walls forming the borehole typically are coated with a mudcake 18. The sonde 10 is equipped with a suitable device, such as a resiliently biassed arm 20, that maintains one side of the sonde in contact with the borehole wall. That side of the sonde has a lengthwise pad member 22, which is urged against the portion of the borehole wall opposite the arm 20 by resiliently actuated arms 22a so that the pad member follows as much as possible all irregularities in the borehole wall.

Located along the pad member 22 in substantial alignment with the lengthwise axis of the sonde and diametrically opposite from the arm 20 are a gamma ray source 24, a near-spaced gamma ray detector 26, an intermediate-spaced gamma ray detector 27 and a far-spaced gamma ray detector 28. The gamma ray detectors are located sufficiently far (more than the mean free path length of gamma rays from the source to the detector, which is generally about two inches) from the gamma ray source, so that the count rates decrease as the densities of the formation and mudcake materials adjacent to them increase. The detectors 26, 27 and 28 are located, respectively, at successively greater distances from the source 24.

The source 24, which may be any suitable source of gamma rays such as Cesium 137, is received in a collimating cavity 30, which is surrounded by a high density shielding material 32, such as tungsten. The cavity 30 is closed by a window 34 of a material transparent to gamma rays, such as an epoxy resin.

The near-spaced detector 26, and possibly also the intermediate-spaced detector 27, consists of a CZT crystal, electrically coupled to a preamplifier (not shown). Because CZT is a solid state detector, a photomultiplier is not required and conventional solid state packaging may be employed. Because of its small size, the CZT detector is especially advantageous in multi-detector tools, such as that shown in FIG. 6, or where close spacing of the detectors to the source or to one another is otherwise desirable. The use of a hemispherical detector configuration is preferred where enhanced spectral quality is desired. For applications in which leakage current problems are to be minimized, a planar detector configuration is preferred. Where the detector spacing from the source is sufficiently large as to degrade count rate statistics, however, it is preferable to employ a larger classical detector, such as NaI. In the sonde of FIG. 6, therefore, the far-spaced detector 28 is preferably a NaI detector, in which case the detector crystal would be optically coupled to a photomultiplier in the conventional manner.

The external wall of the pad member has a shield 36 of a high density material, such as tungsten, and the crystal of each detector is positioned in a non-collimating window in the shield 36 of a material, such as an epoxy resin, that is transparent to gamma rays.

An electronics unit 38 in the sonde 10 receives the output pulses from each of the three detectors, processes them, and transfers processed data through a conductor in the cable 12 to a computer 40 at the surface. The unit 38 counts the output pulses from each detector for a predetermined time period (e.g., 0.1 sec.) at appropriate time intervals, converts the total count between appropriate high limits for each detector to a count rate, and digitizes each count rate. The count rate data transmitted from the sonde electronics unit 38 are processed in the computer 40, which provides outputs to a plotter 42 that produces a log 44 of formation density and/or $P_e$ as a function of borehole depth. The count rate data can, of course, also be stored in a computer memory device for separate or additional processing at a location remote from the borehole site.

Although not shown in FIG. 6, it will be understood that conventional cable-following and depth-measuring equipment will be provided at the surface for coaction with the computer 40 and plotter 42 to generate the log 44. The processing of the count rate data in the computer 40 to derive the $\rho_b$ and $P_e$ values may be carried out in a manner known in the art. Reference may be made in that regard to the copending, commonly-owned U.S. application Ser. No. 08/059,689 by Case et al., filed May 10, 1993, for "Compensated Gamma-Gamma Density Sonde Using Three Detectors", the pertinent portions of which are incorporated herein by reference.

If desired, a conventional two-detector sonde may be used in lieu of the three-detector sonde illustrated in FIG. 6. Reference may be made to Ellis, D. V., Well Logging for Earth Scientists, Elsevier Science Publishing Company, Inc., New York, 1987, and Tittman, J., *Geophysical Well Logging*, Academic Press, Inc., Orlando, Fla., 1986, for a detailed description of gamma-gamma density and photoelectric absorption factor logging using two detectors. The pertinent portions of the Ellis and Tittman publications are also incorporated herein by reference.

Although the invention has been described and illustrated herein by reference to representative embodiments thereof, it will be understood that such embodiments are susceptible of variation and modification without departing from the inventive concepts disclosed. All such variations and modifications, therefore, are intended to be included within the spirit and scope of the claims.

I claim:

1. Apparatus for investigation of subsurface earth formations, comprising:

a sonde adapted for movement through a borehole traversing an earth formation to be investigated;

a detector carried by said sonde for detecting gamma ray or x-ray radiation and including a cadmium zinc telluride crystal having a coating of boron nitride to reduce current leakage at high temperatures and applied bias voltages; and means coupled to the detector for generating a signal representative of at least one characteristic of the radiation detected by said detector.

2. An apparatus as claimed in claim 1, wherein the crystal is composed of a single crystal of cadmium zinc telluride having the general formulation $Cd_{1-x}Zn_xTe$, where x represents the zinc fraction of the material.

3. An apparatus as claimed in claim 1, wherein $0.05<x<0.95$.

4. An apparatus as claimed in claim 1, further comprising a radiation source carried by the sonde for irradiating the earth formations in the region of the borehole with penetrating radiation capable of interactions with the earth formations resulting in gamma ray or x-ray radiation having characteristics carrying information about the earth formations.

5. An apparatus as claimed in claim 4, further comprising:

a plurality of detectors carried by sonde in spaced relationship to the source and to one another along the length of the sonde; and means coupled to each of the detectors for generating a signal representative of at least one of the characteristics of the radiation detector by each detector.

6. An apparatus as claimed in claim 5, further comprising means for deriving from the signals generated by the plurality of detectors an indication of the bulk density of the irradiated earth formations.

7. An apparatus as claimed in claim 5, further comprising means for deriving from the signals generated by the plurality of detectors an indication of the photoelectric absorption factor of the irradiated earth formations.

8. Apparatus for investigation of subsurface earth formations, comprising:

a sonde adapted for movement through a borehole traversing an earth formation to be investigated;

a detector carried by said sonde for detecting gamma ray or x-ray radiation and including a cadmium zinc telluride crystal having an oxidized surface to reduce current leakage at high temperatures and applied bias voltages; and means coupled to the detector for generating a signal representative of at least one characteristic of the radiation detected by said detector.

9. An apparatus as claimed in claim 8, wherein the crystal is composed of a single crystal of cadmium zinc telluride having the general formulation $Cd_{1-x}Zn_xTe$, where x represents the zinc fraction of the material.

10. An apparatus as claimed in claim 8, wherein $0.05<x<0.95$.

11. An apparatus as claimed in claim 8, further comprising a radiation source carried by the sonde for irradiating the earth formations in the region of the borehole with penetrating radiation capable of interactions with the earth formations resulting in gamma ray or x-ray radiation having characteristics carrying information about the earth formations.

12. An apparatus as claimed in claim 8, further comprising:

a plurality of detectors carried by sonde in spaced relationship to the source and to one another along the length of the sonde; and means coupled to each of the detectors for generating a signal representative of at least one of the characteristics of the radiation detector by each detector.

13. An apparatus as claimed in claim 12, further comprising means for deriving from the signals generated by the plurality of detectors an indication of the bulk density of the irradiated earth formations.

14. An apparatus as claimed in claim 12, further comprising means for deriving from the signals generated by the plurality of detectors an indication of the photoelectric absorption factor of the irradiated earth formations.

* * * * *